(12) United States Patent
Wang et al.

(10) Patent No.: US 10,566,626 B2
(45) Date of Patent: Feb. 18, 2020

(54) OLIGOMER-POLYMER AND LITHIUM BATTERY

(71) Applicants: National Taiwan University of Science and Technology, Taipei (TW); Industrial Technology Research Institute, Hsinchu (TW)

(72) Inventors: Fu-Ming Wang, Taipei (TW); Bing-Joe Hwang, Taipei (TW); Chorng-Shyan Chern, Taipei (TW); Jung-Mu Hsu, Penghu County (TW); Jing-Pin Pan, Hsinchu County (TW); Chang-Rung Yang, Hsinchu (TW); Quoc Thai Pham, Taipei (TW)

(73) Assignees: National Taiwan University of Science and Technology, Taipei (TW); Industrial Technology Research Institute, Hsinchu (TW)

( * ) Notice: Subject to any disclaimer, the term of this patent is extended or adjusted under 35 U.S.C. 154(b) by 204 days.

(21) Appl. No.: 15/619,061

(22) Filed: Jun. 9, 2017

(65) Prior Publication Data
US 2018/0131003 A1      May 10, 2018

(30) Foreign Application Priority Data

Nov. 7, 2016   (TW) .............................. 105136149 A (51) Int. Cl.
*H01M 4/60* (2006.01)
*C08G 83/00* (2006.01)
(Continued)

(52) U.S. Cl.
CPC .......... *H01M 4/608* (2013.01); *C08G 83/005* (2013.01); *H01M 10/0525* (2013.01);
(Continued)

(58) Field of Classification Search
CPC ............ H01M 4/608; H01M 10/0525; H01M 10/0567; H01M 2004/028; H01M 2300/0025
See application file for complete search history.

(56) References Cited

U.S. PATENT DOCUMENTS

2010/0167129 A1    7/2010   Wu et al.

FOREIGN PATENT DOCUMENTS

| CN | 102569886 | * | 7/2012 |
| CN | 103880821 | | 6/2014 |

(Continued)

OTHER PUBLICATIONS

"Office Action of Taiwan Counterpart Application," dated Jun. 26, 2017, p. 1-p. 5.

(Continued)

*Primary Examiner* — Laura Weiner
(74) *Attorney, Agent, or Firm* — J.C. Patents (57) ABSTRACT

An oligomer-polymer is provided. The oligomer-polymer is obtained by the polymerization reaction of a compound containing an ethylenically unsaturated group and a nucleophile compound, wherein the nucleophile compound includes the compound shown in formula 1:

(Continued)

A lithium battery including an anode, a cathode, an isolation film, an electrolyte solution, and a package structure is also provided, wherein the cathode includes the oligomer-polymer.

5 Claims, 3 Drawing Sheets

(51) Int. Cl.
  *H01M 10/0525* (2010.01)
  *H01M 10/0567* (2010.01)
  *H01M 4/02* (2006.01)

(52) U.S. Cl.
  CPC .. *H01M 10/0567* (2013.01); *H01M 2004/028* (2013.01); *H01M 2300/0025* (2013.01)

(56) References Cited

FOREIGN PATENT DOCUMENTS

| | | |
|---|---|---|
| CN | 105026447 | 11/2015 |
| CN | 106536590 | 3/2017 |
| JP | S51102097 | 9/1976 |
| TW | I251361 | 3/2006 |
| TW | 200832781 | 8/2008 |
| TW | I332284 | 10/2010 |
| TW | I335917 | 1/2011 |
| TW | I338964 | 3/2011 |
| TW | I354579 | 12/2011 |
| TW | I361822 | 4/2012 |
| TW | I372481 | 9/2012 |
| TW | I376828 | 11/2012 |
| TW | I377717 | 11/2012 |
| TW | I458155 | 10/2014 |
| TW | I494350 | 8/2015 |

OTHER PUBLICATIONS

Fu-Ming Wanga et al.,"Self-polymerized membrane derivative of branched additive for internal short protection of high safety lithium ion battery", Journal of Membrane Science, vol. 368, issue1-2, Feb. 15, 2011, pp. 165-170.

Yu-Han Li et al.,"Electrochemical characterization of a branched oligomer as a high-temperature and long-cycle-life additive for lithium-ion batteries", Electrochimica Acta, vol. 85, Dec. 15, 2012, pp. 72-77.

Yu-Han Li et al.,"Electrochemical performance and safety features of high-safety lithium ion battery using novel branched additive for internal short protection", Applied Surface Science, vol. 261, Nov. 15, 2012, pp. 306-311.

"Office Action of China Counterpart Application", dated Apr. 28, 2019, pp. 1-5.

\* cited by examiner

OLIGOMER-POLYMER AND LITHIUM BATTERY

CROSS-REFERENCE TO RELATED APPLICATION

This application claims the priority benefit of Taiwan application serial no. 105136149, filed on Nov. 7, 2016. The entirety of the above-mentioned patent application is hereby incorporated by reference herein and made a part of this specification.

BACKGROUND OF THE INVENTION

Field of the Invention

The invention relates to an oligomer-polymer, and more particularly, to an oligomer-polymer for a lithium battery.

Description of Related Art

Since primary batteries are not environment-friendly, the market demand for secondary lithium batteries with characteristics such as rechargeability, light weight, high voltage value, and high energy density has been growing in recent years. As a result, the current performance requirements for secondary lithium batteries such as light weight, durability, high voltage, high energy density, and high safety have become higher. In particular, secondary lithium batteries have very high potential in the application and expandability in light electric vehicles, electric vehicles, and the large power storage industry.

However, among the commercialized secondary lithium batteries in the general market, since lithium transition metal oxide is used as the cathode, the cathode readily reacts with the electrolyte solution in high temperature applications and becomes damaged. As a result, oxygen in the lithium metal oxide is released and becomes part of a combustion reaction. This is one of the main causes for the explosion, swelling, and performance degradation of the secondary lithium battery. Therefore, continuously maintaining good structural stability of the cathode material in high temperature applications is one of the desired goals of those skilled in the art.

SUMMARY OF THE INVENTION

The invention provides an oligomer-polymer that can be applied in the cathode material of a lithium battery such that the lithium battery still has good performance in a high-temperature environment.

The oligomer-polymer of the invention is obtained by the polymerization reaction of a compound containing an ethylenically unsaturated group and a nucleophile compound, wherein the nucleophile compound includes a compound shown in formula 1 below:

formula 1

In an embodiment of the invention, the mole ratio of the compound containing an ethylenically unsaturated group and the nucleophile compound is between 2:1 and 1:1.

In an embodiment of the invention, the compound containing an ethylenically unsaturated group includes a maleimide-based compound.

In an embodiment of the invention, the maleimide-based compound includes, for instance, monomaleimide or bismaleimide.

In an embodiment of the invention, the nucleophile compound further includes the compound shown in formula 2 below:

formula 2

In an embodiment of the invention, in the nucleophile compound, the mole ratio of the compound shown in formula 1 and the compound shown in formula 2 is between 2:1 and 1:1.

In an embodiment of the invention, the reaction temperature of the polymerization reaction is between 25° C. and 200° C.

A lithium battery of the invention includes an anode, a cathode, an isolation film, an electrolyte solution, and a package structure. The cathode and the anode are separately disposed, and the cathode includes any of the above oligomer-polymers. The isolation film is disposed between the anode and the cathode, and the isolation film, the anode, and the cathode define a housing region. The electrolyte solution is disposed in the housing region. The package structure packages the anode, the cathode, and the electrolyte solution.

In an embodiment of the invention, the electrolyte solution includes an organic solvent, a lithium salt, and an additive.

In an embodiment of the invention, the additive includes monomaleimide, polymaleimide, bismaleimide, polybismaleimide, a copolymer of bismaleimide and monomaleimide, vinylene carbonate, or a mixture thereof.

Based on the above, by using the compound containing an ethylenically unsaturated group and the nucleophile compound including the compound shown in formula 1 to prepare the oligomer-polymer of the invention, the oligomer-polymer of the invention can be applied in the cathode material of a lithium battery, such that the lithium battery still has good capacitance, battery efficiency, and charge and discharge cycle life even in high-temperature operation.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and the smaller numerical range in the specification.

Moreover, in the present specification, skeleton formulas are sometimes used to represent compound structures. Such representation can omit carbon atoms, hydrogen atoms, and carbon-hydrogen bonds. Of course, structural formulas with clear illustrations of functional groups are definitive.

To prepare an oligomer-polymer that can be applied in the cathode material of a lithium battery such that the lithium battery still has good performance in a high-temperature environment, the invention provides an oligomer-polymer that can achieve the advantages above. In the following, embodiments are provided as examples of actual implementation of the invention.

An embodiment of the invention provides an oligomer-polymer. The oligomer-polymer is obtained by the polymerization reaction of a compound containing an ethylenically unsaturated group and a nucleophile compound, wherein the nucleophile compound includes the compound shown in formula 1:

formula 1

In the present embodiment, the compound containing an ethylenically unsaturated group includes, for instance, a maleimide-based compound. Specifically, in the present embodiment, the maleimide-based compound includes, for instance, monomaleimide or bismaleimide. The monomaleimide is, for instance, selected from the group consisting of unsubstituted maleimide, N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, and 2,6-xylylmaleimide; and the bismaleimide can have the structure represented by formula I:

formula I wherein $R_1$ includes:

Moreover, in the present embodiment, the oligomer-polymer is obtained by the addition polymerization reaction of the compound containing an ethylenically unsaturated group and the nucleophile compound via a Michael addition reaction. In other words, at this point, the Michael addition reaction occurs between oxygen atoms of the hydroxyl group in the compound shown in formula 1 and C=C double bonds in the compound containing an ethylenically unsaturated group. Specifically, the addition polymerization reaction of the compound containing an ethylenically unsaturated group and the nucleophile compound can be performed using any known method.

In an embodiment, a method of performing the addition polymerization reaction on the compound containing an ethylenically unsaturated group and the nucleophile compound includes, for instance: dissolving the compound containing an ethylenically unsaturated group and the nucleophile compound in a solvent and reacting the mixture at a temperature of 25° C. to 200° C. for 0.5 hours to 5 hours.

In the above steps, the mole ratio of the compound containing an ethylenically unsaturated group and the nucleophile compound is between 2:1 and 1:1. If the mole ratio of the compound containing an ethylenically unsaturated group and the nucleophile compound is less than 2:1, then the Michael addition reactivity is poor; and if the mole ratio of the compound containing an ethylenically unsaturated group and the nucleophile compound is higher than 1:1, then an excessive amount of the nucleophile compound remains such that an electrochemical side reaction occurs.

The solvent can be an organic solvent, such as (but not limited to) N-methyl pyrollidone (NMP), dimethylformamide (DMF), dimethyl sulfoxide (DMSO), dimethylacetamide (DMAC), or a combination thereof.

In another embodiment, the addition polymerization reaction can also be performed in the presence of a catalyst, i.e., the compound containing an ethylenically unsaturated group, the nucleophile compound, and the catalyst are dissolved in the solvent for the reaction. At this point, the reaction temperature is, for instance, between, 25° C. and 80° C., the reaction time is, for instance, between 0.5 hours and 2 hours, the catalyst is, for instance, triethylamine or dibenzyl trithiocarbonate (DBTTC), and the content of the catalyst is, for instance, 1 part by weight to 10 parts by weight.

Moreover, in the present embodiment, the nucleophile compound can further include the compound shown in formula 2 below:

formula 2

Specifically, the compound shown in formula 1 and the compound shown in formula 2 are tautomers, and the compound shown in formula 2 tends to be converted into the compound shown in formula 1 when the pH is greater than 6. As a result, as described above, when the oligomer-polymer is prepared by a Michael addition reaction under alkaline conditions, the nucleophile compound must include the compound shown in formula 1.

More specifically, since the pH of the reaction environment affects the balance between the compound shown in formula 1 and the compound shown in formula 2, the ratio of the compound shown in formula 1 and the compound shown in formula 2 in the nucleophile compound changes with the pH. For instance, in comparison to weak alkaline reaction conditions, under strong alkaline reaction conditions, the proportion of the compound shown in formula 1 in the nucleophile compound is higher, even the compound shown in formula 2 may not even exist. In other words, in the present embodiment, the oligomer-polymer can be obtained by the polymerization reaction of the compound containing an ethylenically unsaturated group and the compound shown in formula 1, or the oligomer-polymer can be obtained by the polymerization reaction of the compound containing an ethylenically unsaturated group, the compound shown in formula 1, and the compound shown in formula 2, and the ratio of the compound shown in formula 1 and the compound shown in formula 2 changes with the pH.

In an embodiment, the oligomer-polymer is prepared under the following conditions: the compound containing an ethylenically unsaturated group, the nucleophile compound, and the triethylamine catalyst are dissolved in an N-methylpyrrolidone solvent, and the mixture is reacted at a temperature of 30° C. to 50° C. for 0.5 hours to 2 hours. At this point, since N-methylpyrrolidone is weakly alkaline and triethylamine is a weak alkaline catalyst, the nucleophile compound includes the compound shown in formula 1 and the compound shown in formula 2, and the synthesis mole ratio is between 2:1 and 1:1. From another perspective, a Michael addition reaction is performed on oxygen atoms of the hydroxyl group in the compound shown in formula 1 and nitrogen atoms of secondary amine in the compound shown in formula 2 with C=C double bonds in the compound containing an ethylenically unsaturated group.

It should be mentioned that, in the present embodiment, the oligomer-polymer has a hyperbranched structure. "Hyperbranched structure" is a structure formed by adding the nucleophile compound on the C=C double bonds of the compound containing an ethylenically unsaturated group such that the C=C double bonds of the compound containing an ethylenically unsaturated group can be opened up allowing the two carbon atoms or one of the two carbon atoms to bond with other atoms for branching and ordering polymerization reactions by using the compound containing an ethylenically unsaturated group as an architecture matrix during the addition polymerization reaction of the compound containing an ethylenically unsaturated group and the nucleophile compound (i.e., the compound shown in formula 1, or the compound shown in formula 1 and the compound shown in formula 2).

It should be mentioned that, the oligomer-polymer obtained by the polymerization reaction of the compound containing an ethylenically unsaturated group and the nucleophile compound (i.e., the compound shown in formula 1, or the compound shown in formula 1 and the compound shown in formula 2) can be applied in the cathode material of a lithium battery. More specifically, the oligomer-polymer forms a protective layer on the surface of the cathode material, and the protective layer can effectively prevent damage to the cathode structure in a high-temperature environment, with the reason being that the oligomer-polymer has a hyperbranched structure as described above, and therefore the oligomer-polymer can form a stable complex with the metal oxide in a regular cathode material and be distributed on the surface thereof. Moreover, since the oligomer-polymer has a rigid chemical structure, the resulting protective layer can have high thermal stability. In this way, the lithium battery having the cathode material including the oligomer-polymer can still have good capacitance, battery efficiency and safety in a high-temperature environment, and the cycle life of the battery can be improved.

Another embodiment of the invention provides a lithium battery including the oligomer-polymer in any one of the above embodiments. In the following, description is provided with reference to FIG. 1.

Figure 1:
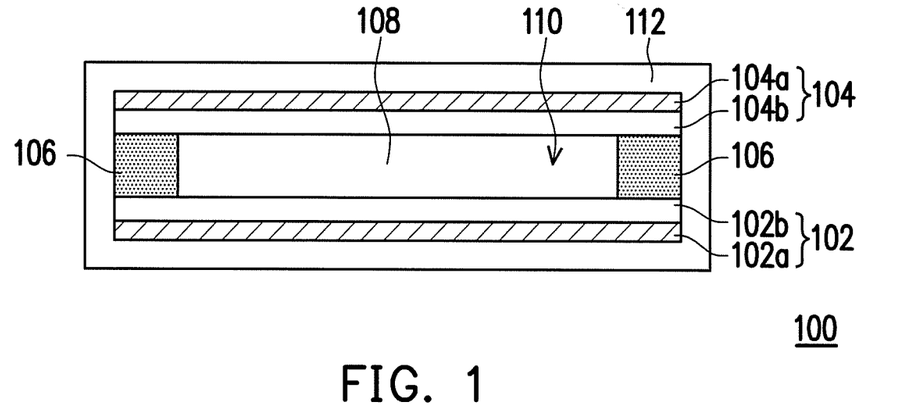
FIG. 1 is a cross-sectional schematic of a lithium battery according to an embodiment of the invention.

FIG. 1 is a cross-sectional schematic of a lithium battery according to an embodiment of the invention.

Referring to FIG. 1, a lithium battery 100 includes an anode 102, a cathode 104, an isolation film 106, an electrolyte solution 108, and a package structure 112.

In the present embodiment, the anode 102 includes an anode metal foil 102a and an anode material 102b, wherein the anode material 102b is disposed on the anode metal foil 102a through coating or sputtering. The anode metal foil 102a is, for instance, a copper foil, an aluminum foil, a nickel foil, or a high-conductivity stainless steel foil. The anode material 102b is, for instance, carbide or metal lithium. The carbide used as the anode material 102b is, for instance, carbon powder, graphite, carbon fiber, carbon nanotube, graphene, or a mixture thereof. However, in other embodiments, the anode 102 can also only include the anode material 102b.

The cathode 104 and the anode 102 are separately disposed. The cathode 104 includes a cathode metal foil 104a and a cathode material 104b, wherein the cathode material 104b is disposed on the cathode metal foil 104a through coating. The cathode metal foil 104a is, for instance, a copper foil, an aluminum foil, a nickel foil, or a high-conductivity stainless steel foil. The cathode material 104b includes the oligomer-polymer in any one of the above embodiments and a lithium-mixed transition metal oxide. Specifically, in the present embodiment, the oligomer-polymer is used as a cathode material additive. The lithium-mixed transition metal oxide is, for instance, $LiAl_{0.05}Co_{0.95}O$, $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $Li[NiLi_{(1-2x)/3}Mn_{(2-x)/3}]O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or a combination thereof, where $0<x<1$ and Mc is a divalent metal. Moreover, in the present embodiment, based on a total weight of 100 parts by weight of the cathode material 104b, the content of the oligomer-polymer is 0.1 parts by weight to 10 parts by weight, preferably 0.1 parts by weight to 5 parts by weight; and the content of the lithium-mixed transition metal oxide is, for instance, 80 parts by weight to 92 parts by weight, preferably 85 parts by weight to 90 parts by weight. If the content of the oligomer-polymer is less than 0.1 parts by weight, then the battery safety characteristic is not significant; and if the content of the oligomer-polymer is higher than 10 parts by weight, then the battery cycle life is poor.

Moreover, in an embodiment, the lithium battery 100 can further include a polymer binder, and the polymer binder reacts with the anode 102 and/or the cathode 104 to increase the mechanical properties of the electrode(s). Specifically, the anode material 102b can be adhered to the anode metal foil 102a through the polymer binder, and the cathode material 104b can be adhered to the cathode metal foil 104a through the polymer binder. The polymer binder is, for instance, polyvinylidene difluoride (PVDF), styrene-butadiene rubber (SBR), polyamide, melamine resin, or a combination thereof.

The isolation film 106 is disposed between the anode 102 and the cathode 104, and the isolation film 106, the anode 102, and the cathode 104 define a housing region 110. The material of the isolation film 106 is, for instance, an insulating material, and the insulating material can be polyethylene (PE), polypropylene (PP), or a multilayer composite structure of the materials, such as PE/PP/PE.

In the present embodiment, the electrolyte solution 108 is disposed in the housing region 110, and the electrolyte solution 108 includes an organic solvent, a lithium salt, and an additive. In particular, the content of the organic solvent in the electrolyte solution 108 is 55 wt % to 90 wt %, the content of the lithium salt in the electrolyte solution 108 is 10 wt % to 35 wt %, and the content of the additive in the electrolyte solution 108 is 0.05 wt % to 10 wt %. However, in other embodiments, the electrolyte solution 108 may also not include an additive.

The organic solvent is, for instance, γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof.

The lithium salt is, for instance, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6FsSO_3$, $LiO_2CCF_3$, $LiSO_3F$, $LiB(C_6H_5)_4$, $LiCF_3SO_3$, or a combination thereof.

The additive includes, for instance, monomaleimide, polymaleimide, bismaleimide, polybismaleimide, a copolymer of bismaleimide and monomaleimide, vinylene carbonate (VC), or a mixture thereof. The monomaleimide is, for instance, selected from the group consisting of unsubstituted maleimide, N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, and 2,6-xylylmaleimide. The bismaleimide can have the structure represented by formula I above.

The package structure 112 is used to package the anode 102, the cathode 104, and the electrolyte solution 108. The material of the package structure 112 is, for instance, aluminum foil.

It should be mentioned that, the cathode material 104b of the lithium battery 100 includes the oligomer-polymer and the lithium-mixed transition metal oxide, and therefore, as described above, the oligomer-polymer having a hyperbranched structure can form a stable complex with the lithium-mixed transition metal oxide and form the protective layer on the surface of the lithium-mixed transition metal oxide. Moreover, since the oligomer-polymer has the rigid chemical structure, the resulting protective layer can have high thermal stability. In this way, the lithium battery 100 having the cathode material 104b including the oligomer-polymer can still have good capacitance, safety, and battery efficiency in a high-temperature environment, and the cycle life of the battery can be improved.

Moreover, the cathode 104 having the protective layer in the lithium battery 100 can be formed by adding the oligomer-polymer in the cathode material in a current battery manufacturing process. Therefore, the capacitance, battery efficiency, and charge and discharge cycle life of the lithium battery 100 can be effectively maintained at high temperature without modifying any battery design, electrode material and electrolyte solution.

Example 1 and Comparative Examples 1 to 2 are provided below to more specifically describe the invention. Although the following examples are described, the materials used and the amount and ratio thereof, as well as handling details and handling process . . . etc., can be suitably modified without exceeding the scope of the invention. Accordingly, restrictive interpretation should not be made to the invention based on the experiments described below.

Example 1

Preparation of Anode

Metal lithium was cut into a suitable shape and inserted directly to form the anode.

Preparation of Cathode 40 parts by weight (0.5 moles) of a compound containing an ethylenically unsaturated group, 50 parts by weight (0.5 moles) of a nucleophile compound, and 10 parts by weight of a triethylamine catalyst were added in a suitable amount of an N-methylpyrrolidone solvent, and the components were mixed and stirred to react for 2 hours at a temperature of 25° C. to prepare the oligomer-polymer of Example 1, wherein the structural formula of the compound containing an ethylenically unsaturated group is a bismaleimide as shown in formula I:

formula I $R_1$ in formula I is and a suitable synthesis mole ratio of the compound shown in formula 1 and the compound shown in formula 2 in the nucleophile compound is about 3:2;

formula 1 formula 2

Next, 90 parts by weight of $LiAl_{0.05}Co_{0.95}O_2$, 5 parts by weight of polyvinyl difluoride (PVDF), and 5 parts by weight of acetylene black (conductive powder) were uniformly mixed in the N-methylpyrrolidone solvent. Next, 0.5 parts by weight of the oligomer-polymer of Example 1 was added to the mixed solution to form the cathode material. Then, after the material was coated on an aluminum foil, the aluminum foil with the material coated thereon was dried, compressed, and then cut to form the cathode.

Preparation of Electrolyte Solution $LiPF_6$ was dissolved in a mixed solution of propylene carbonate (PC), ethylene carbonate (EC), and diethyl carbonate (DEC) (volume ratio: PC/EC/DEC=2/3/5) to prepare an electrolyte solution having a concentration of 1 M, wherein the mixed solution was used as an organic solvent in the electrolyte solution, and $LiPF_6$ was used as lithium salt in the electrolyte solution.

Manufacture of Lithium Battery

After polypropylene was used as the isolation film to isolate the anode and the cathode and define the housing region, the electrolyte solution was added in the housing region between the anode and the cathode. Lastly, the above structure was sealed with a package structure to complete the manufacture of the lithium battery of Example 1.

Comparative Example 1

Preparation of Anode

The anode of Comparative Example 1 was prepared based on the same preparation process as Example 1.

Preparation of Cathode 40 parts by weight (0.5 moles) of a maleimide-based compound, 50 parts by weight (0.5 moles) of a barbituric acid compound, and 10 parts by weight of a triethylamine catalyst were added in a suitable amount of an N-methyl-pyrrolidone solvent, and the components were mixed and stirred to react for 3 hours at a temperature of 80° C. to prepare the oligomer-polymer of Comparative Example 1, wherein the structural formula of the maleimide-based compound is a bismaleimide as shown in formula I:

formula I $R_1$ in formula I is the structural formula of the barbituric acid compound (nucleophile compound) is as shown in formula II below, and $R_2$ and $R_3$ in formula II are H:

formula II

Next, 90 parts by weight of $LiAl_{0.05}Co_{0.95}O_2$, 5 parts by weight of polyvinyl difluoride (PVDF), and 5 parts by weight of acetylene black (conductive powder) were uniformly mixed in the N-methylpyrrolidone solvent. Next, 0.5 parts by weight of the oligomer-polymer of Comparative Example 1 was added in the mixed solution to form the cathode material. Then, after the material was coated on an aluminum foil, the aluminum foil with the material coated thereon was dried, compressed, and then cut to form the cathode.

Preparation of Electrolyte Solution

The electrolyte solution of Comparative Example 1 was prepared based on the same preparation process as Example 1.

Manufacture of Lithium Battery

The lithium battery of Comparative Example 1 was made according to a similar manufacturing process as Example 1, and the difference thereof is only in that: in the lithium battery of Comparative Example 1, the cathode material includes the oligomer-polymer of Comparative Example 1; and in the lithium battery of Example 1, the cathode material includes the oligomer-polymer of Example 1.

Comparative Example 2

Preparation of Cathode

The cathode of Comparative Example 2 was prepared according to a similar preparation process as Example 1, and the difference thereof is only in that: the cathode material of Comparative Example 2 does not include oligomer-polymer.

Preparation of Anode

The anode of Comparative Example 1 was prepared based on the same preparation process as Example 2.

Preparation of Electrolyte Solution

The electrolyte solution of Comparative Example 2 was prepared based on the same preparation process as Example 1.

Manufacture of Lithium Battery

The lithium battery of Comparative Example 2 was made according to a similar manufacturing process as Example 1, and the difference thereof is only in that: in the lithium battery of Comparative Example 2, no cathode material additive was added in the cathode material; and in the lithium battery of Example 1, the cathode material includes the oligomer-polymer of Example 1.

Figure 2:
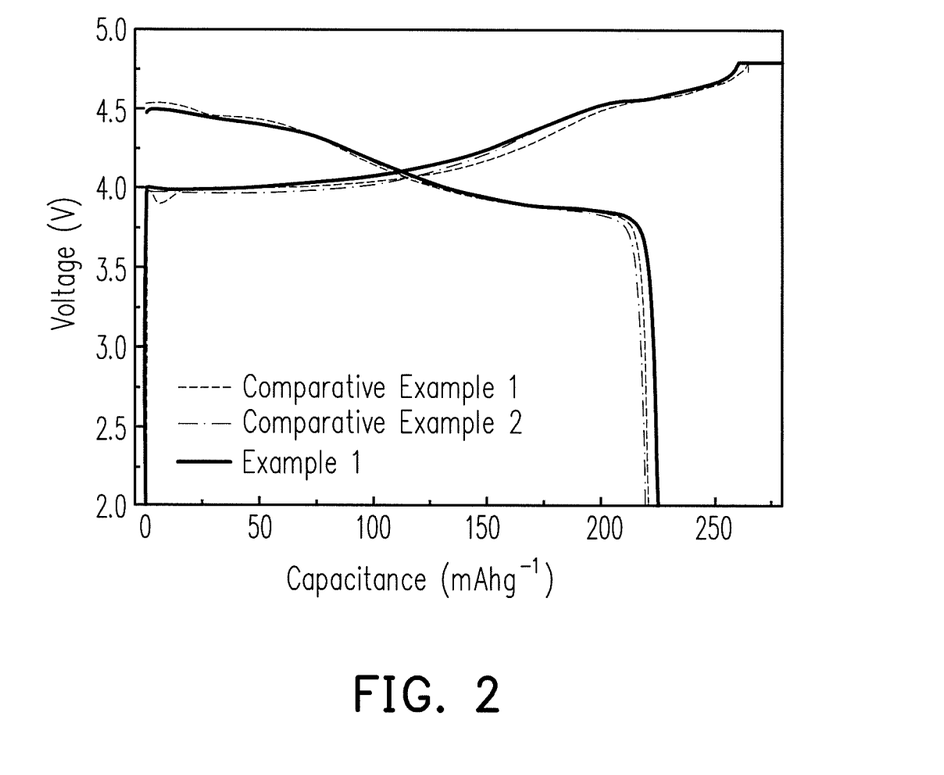
FIG. 2 shows a curve diagram illustrating the relationship between capacitance and voltage of the lithium battery of each of Example 1 and Comparative Examples 1 and 2 of the invention at room temperature.

Next, a charge and discharge performance test was performed on the lithium batteries of Example 1 and Comparative Examples 1 to 2, and the measurement results thereof are shown in Table 1 and FIG. 2. A charge and discharge cycle test was performed on the lithium batteries of Example 1 and Comparative Example 2, and the measurement results thereof are shown in Table 2 and FIG. 3.

Charge and Discharge Performance Test

The first cycle of charge and discharge was performed on the lithium batteries of Example 1 and Comparative Examples 1 to 2 at fixed current/voltage at room temperature (30° C.) using a potentiostat (made by Biologic Corporation, model: VMP3). First, the batteries were charged to 4.8 V with a constant current of 0.1 C until the current was less than or equal to 0.02 C. Then, the batteries were discharged to the cut-off voltage 2 V with a constant current of 0.1 C. The discharge capacity and irreversibility ratio of the lithium batteries of Example 1 and Comparative Examples 1 to 2 are recorded in Table 1 below. FIG. 2 shows a curve diagram illustrating the relationship between capacitance and voltage of the lithium battery of each of Example 1 and Comparative Examples 1 and 2 of the invention at room temperature.

TABLE 1

|  | Discharge capacity (mAh/g) | Irreversibility ratio (%) |
| --- | --- | --- |
| Example 1 | 225.1 | 86.4 |
| Comparative Example 1 | 220.8 | 83.5 |
| Comparative Example 2 | 219.5 | 84.5 |

It can be known from Table 1 and FIG. 2 that, in comparison to the lithium batteries of Comparative Examples 1 to 2, the lithium battery of Example 1 has higher discharge capacity and a similar irreversibility ratio. The results indicate that by preparing the cathode using the oligomer-polymer of the invention obtained by the polymerization reaction of the compound containing an ethylenically unsaturated group and the nucleophile compound including the compound shown in formula 1, not only are battery characteristics not affected, overall energy density of the battery is also increased.

Charge and Discharge Cycle Test

Figure 3:
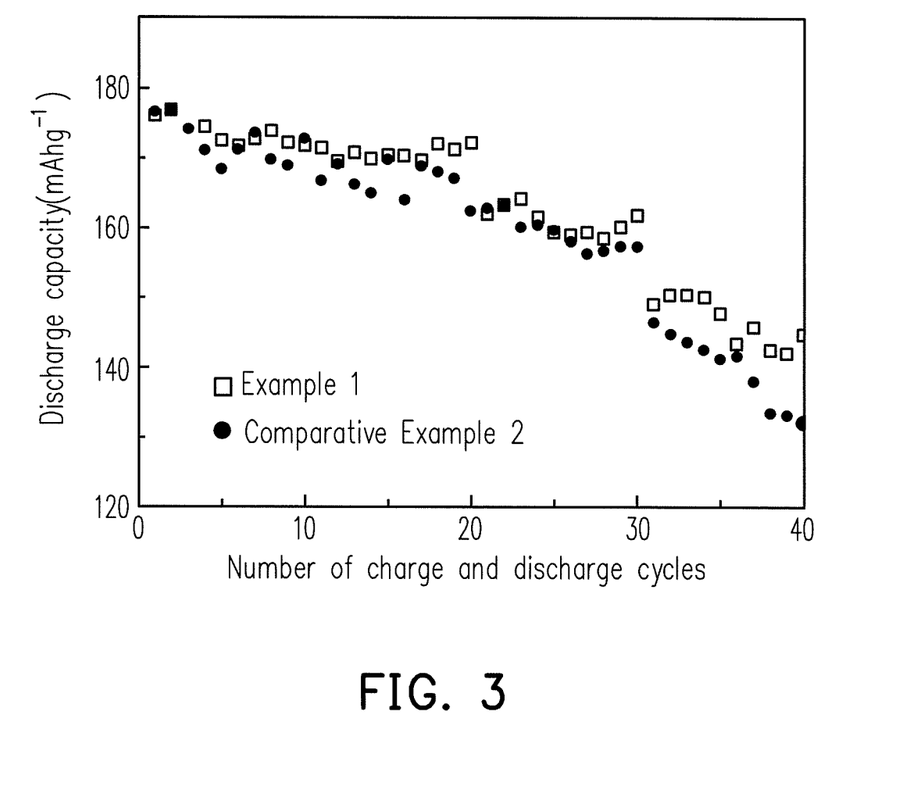
FIG. 3 shows a diagram illustrating the relationship between the number of charge and discharge cycles and discharge capacity of the lithium battery of each of Example 1 and Comparative Example 2 of the invention at room temperature.

The lithium battery of each of Example 1 and Comparative Example 2 was charged and discharged at fixed current/voltage at room temperature (30° C.) using a potentiostat (made by Biologic Corporation, model: VMP3). First, the charge and discharge cycle was repeated 20 times according to the following conditions: the battery was charged to 4.8 V at a fixed current of 0.1 C until the current was less than or equal to 0.02 C, and then the battery was discharged to the cutoff voltage (3 V) at a fixed current of 0.1 C. After the 20 charge and discharge cycles were performed, the charge and discharge cycle was repeated 10 times according to the following conditions: the battery was charged to 4.8 V at a fixed current of 0.1 C until the current was less than or equal to 0.02 C, and then the battery was discharged to the cutoff voltage (3 V) at a fixed current of 0.2 C. Lastly, the charge and discharge cycle was repeated again 10 times according to the following conditions: the battery was charged to 4.8 V at a fixed current of 0.1 C until the current was less than or equal to 0.02 C, and then the battery was discharged to the cutoff voltage (3 V) at a fixed current of 0.5 C to complete a total of 40 charge and discharge cycles. The discharge capacity of the lithium battery of each of Example 1 and Comparative Example 2 of the 40th cycle and the retention rate of the discharge capacity after 40 charge and discharge cycles are recorded in Table 2 below. FIG. 3 shows a diagram illustrating the relationship between the number of charge and discharge cycles and discharge capacity of the lithium battery of each of Example 1 and Comparative Example 2 of the invention at room temperature.

TABLE 2

|  | Discharge capacity of 40th cycle (mAh/g) | Retention rate (%) |
| --- | --- | --- |
| Example 1 | 144.6 | 74.9 |
| Comparative Example 2 | 132.0 | 81.8 |

It can be known from Table 2 and FIG. 3 that, in comparison to the lithium battery of Comparative Example 2, after 40 charge and discharge cycles at room temperature, the lithium battery of Example 1 has higher discharge capacity and capacitance retention rate. The results indicate that by preparing the cathode using the oligomer-polymer of the invention obtained by the polymerization reaction of the compound containing an ethylenically unsaturated group and the nucleophile compound including the compound shown in formula 1, the cathode can still have good structural stability after 40 charge and discharge cycles at room temperature, such that the lithium battery can have good capacitance, battery efficiency, and charge and discharge cycle life. Moreover, the results also prove that the oligomer-polymer of the invention can indeed be accepted by the current lithium battery and improve the safety of the battery.

Figure 4:
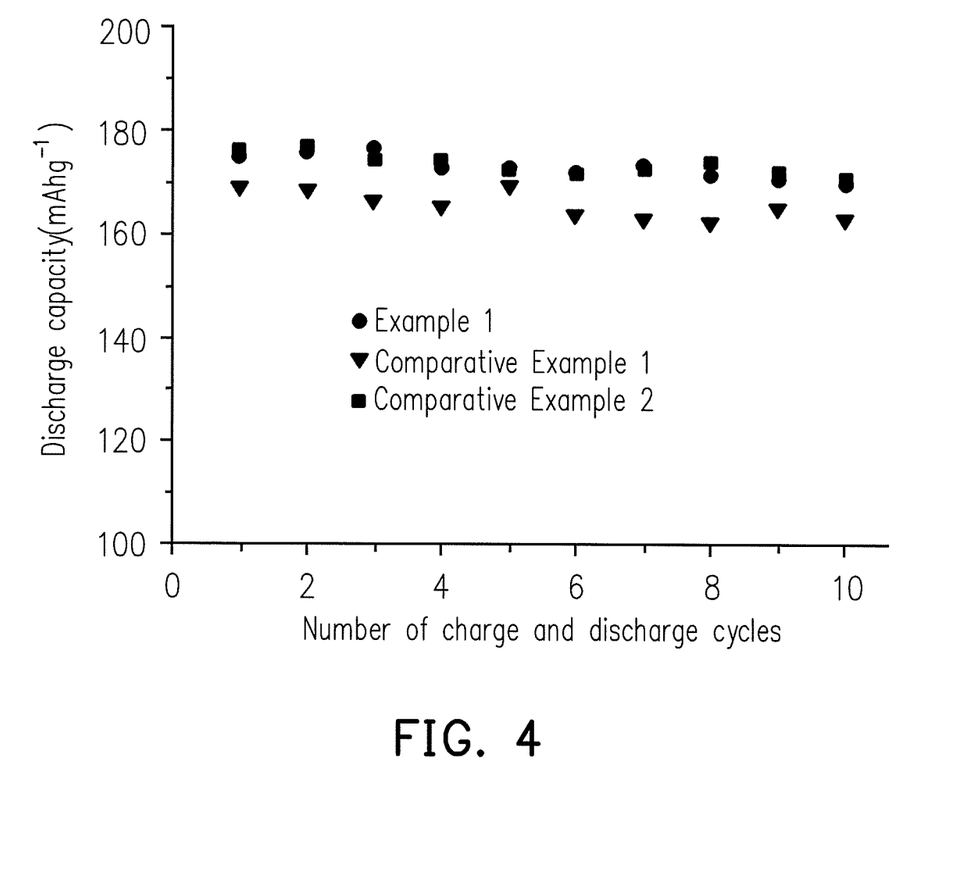
FIG. 4 shows a diagram illustrating the relationship between the number of charge and discharge cycles and discharge capacity of the lithium battery of each of Example 1, Comparative Example 1, and Comparative Example 2 of the invention at high temperature.

Moreover, the lithium battery of each of Example 1, Comparative Example 1, and Comparative Example 2 was charged and discharged at fixed current/voltage at high temperature (55° C.) using a potentiostat (made by Biologic Corporation, model: VMP3). The charge and discharge cycle was repeated 10 times according to the following conditions: the battery was charged to 4.8 V at a fixed current of 0.1 C until the current was less than or equal to 0.02 C, and then the battery was discharged to the cutoff voltage (3 V) at a fixed current of 0.1 C. The discharge capacity of the lithium battery of each of Example 1, Comparative Example 1, and Comparative Example 2 of the 10th cycle and the retention rate of the discharge capacity after 10 charge and discharge cycles are recorded in Table 3 below. FIG. 4 shows a diagram illustrating the relationship between the number of charge and discharge cycles and discharge capacity of the lithium battery of each of Example 1, Comparative Example 1, and Comparative Example 2 of the invention at high temperature.

TABLE 3

|  | Discharge capacity of 10th cycle (mAh/g) | Retention rate (%) |
|---|---|---|
| Example 1 | 172.3 | 98.9 |
| Comparative Example 1 | 166.0 | 96.1 |
| Comparative Example 2 | 172.9 | 97.2 |

It can be known from Table 3 and FIG. 4 that, in comparison to the lithium batteries of Comparative Example 1 and Comparative Example 2, after 10 charge and discharge cycles in a high-temperature environment, the lithium battery of Example 1 has higher capacitance retention rate, and after 10 charge and discharge cycles in a high-temperature environment, the lithium battery of Example 1 still has good discharge capacity. The results indicate that by preparing the cathode using the oligomer-polymer of the invention obtained by the polymerization reaction of the compound containing an ethylenically unsaturated group and the nucleophile compound including the compound shown in formula 1, the cathode can still have good structural stability in a high-temperature environment, such that the lithium battery can have good capacitance, battery efficiency, and charge and discharge cycle life. Moreover, the results also prove that the oligomer-polymer of the invention can indeed be accepted by the current lithium battery and improve the safety of the battery.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A lithium battery, comprising:
an anode;
a cathode disposed separately from the anode, wherein the cathode comprises a cathode material comprising a lithium-mixed transition metal oxide and an oligomer-polymer obtained by a polymerization reaction of a compound containing an ethylenically unsaturated group and a nucleophile compound, wherein the compound containing the ethylenically unsaturated group comprises a maleimide-based compound, the maleimide-based compound in the cathode comprises monomaleimide or bismaleimide, and the nucleophile compound comprises a compound shown in formula 1:

formula 1 wherein a mole ratio of the compound containing the ethylenically unsaturated group and the nucleophile compound is between 2:1 and 1:1,
wherein a content of the oligomer-polymer is 0.1 parts by weight to 10 parts by weight based on a total weight of 100 parts by weight of the cathode material;
an isolation film disposed between the anode and the cathode, wherein the isolation film, the anode, and the cathode define a region;
an electrolyte solution disposed in the region, wherein the electrolyte solution comprises an organic solvent and lithium salt; and
a package structure packaging the anode, the cathode, and the electrolyte solution.

2. The lithium battery of claim 1, wherein the electrolyte solution further comprises an additive, a content of the additive in the electrolyte solution is 0.05 wt % to 10 wt %, the additive comprises a maleimide-based compound, vinylene carbonate, or a mixture thereof, and the maleimide-based compound in the electrolyte solution comprises monomaleimide, polymaleimide, bismaleimide, polybismaleimide, or a copolymer of bismaleimide and monomaleimide.

3. The lithium battery of claim 1, wherein the nucleophile compound further comprises a compound shown in formula 2 below:

formula 2

4. The lithium battery of claim 3, wherein in the nucleophile compound, a mole ratio of the compound shown in formula 1 and the compound shown in formula 2 is between 2:1 and 1:1.

5. The lithium battery of claim 1, wherein a reaction temperature of the polymerization reaction is between 25° C. and 200° C.

* * * * *